(12) United States Patent
Jung et al.

(10) Patent No.: US 9,344,467 B2
(45) Date of Patent: May 17, 2016

(54) SENSOR DATA ACQUISITION SYSTEM AND METHOD BASED ON INTEGRATION OF TERMINAL AND CLOUD

(71) Applicant: Samsung Electronics Co., Ltd., Suwon-si (KR)

(72) Inventors: Eun-Sung Jung, Seongnam-si (KR); Min-Young Mun, Seoul (KR); Bon-Cheol Gu, Seongnam-si (KR); Kyung-Ah Chang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 221 days.

(21) Appl. No.: 13/721,446

(22) Filed: Dec. 20, 2012

(65) Prior Publication Data

US 2013/0159418 A1 Jun. 20, 2013

(30) Foreign Application Priority Data

Dec. 20, 2011 (KR) .................. 10-2011-0138653

(51) Int. Cl.
| | |
|---|---|
| *G06F 15/16* | (2006.01) |
| *H04L 29/06* | (2006.01) |
| *H04L 29/08* | (2006.01) |
| *H04W 40/02* | (2009.01) |
| *H04L 12/733* | (2013.01) |
| *H04W 84/18* | (2009.01) |

(52) U.S. Cl.
CPC ............ *H04L 65/403* (2013.01); *H04L 45/122* (2013.01); *H04L 67/125* (2013.01); *H04W 40/02* (2013.01); *H04W 84/18* (2013.01)

(58) Field of Classification Search
USPC .................. 709/204; 340/539.18; 455/3.01; 370/406
See application file for complete search history.

(56) References Cited

U.S. PATENT DOCUMENTS

| | | | |
|---|---|---|---|
| 7,295,521 B2 | 11/2007 | Choi et al. | |
| 2005/0157698 A1 | 7/2005 | Park et al. | |
| 2006/0178150 A1 | 8/2006 | Kim | |
| 2008/0279204 A1* | 11/2008 | Pratt et al. ..................... 370/406 |
| 2009/0046630 A1 | 2/2009 | Tsai et al. | |
| 2009/0322518 A1* | 12/2009 | Liang et al. .............. 340/539.18 |
| 2010/0304662 A1* | 12/2010 | Huang et al. ................. 455/3.01 |

FOREIGN PATENT DOCUMENTS

| | | |
|---|---|---|
| KR | 10-2005-0008465 A | 1/2005 |
| KR | 10-2006-0006583 A | 1/2006 |
| KR | 10-2006-0089358 A | 8/2006 |

* cited by examiner

*Primary Examiner* — Kyung H Shin
(74) *Attorney, Agent, or Firm* — NSIP Law (57) ABSTRACT

A cloud-based sensor data acquisition system includes one or more sensors configured to acquire sensor data; a first terminal configured to transmit sensor data request information to a cloud server through an access point (AP); and one or more second terminals each configured to acquire sensor data from one or more sensors on a corresponding dissemination tree received from the cloud server; and transmit the acquired sensor data to the first terminal through the AP. The cloud server is configured to, in response to receiving the sensor data request information from the first terminal, build a corresponding dissemination tree for each of one or more second terminals within a sensing range; and transmit the corresponding dissemination tree to each of the one or more second terminals within the sensing range.

16 Claims, 6 Drawing Sheets

SENSOR DATA ACQUISITION SYSTEM AND METHOD BASED ON INTEGRATION OF TERMINAL AND CLOUD

CROSS-REFERENCE TO RELATED APPLICATIONS

This application claims the benefit under 35 USC 119(a) of Korean Patent Application No. 10-2011-0138653 filed on Dec. 20, 2011, in the Korean Intellectual Property Office, the entire disclosure of which is incorporated herein by reference for all purposes.

BACKGROUND

1. Field

The following description relates to a system and a method for acquiring various sensor data of a real world based on integration of terminals and a cloud.

2. Description of Related Art

A wireless sensor network is formed by a group of hundreds or thousands of sensors that are distributed over a wide area in which no wired infrastructure has been built and would difficult to build for the purpose of acquiring sensor information of nearby regions and transmitting the acquired sensor data to other devices. In such a network, nodes that create sensor data are referred to as "source nodes" and a final node that receives the sensor data from one or more source nodes is referred to as a "sink node." Transmission of sensor data created by a source node to multiple sink nodes is referred to "data dissemination," and a data transmission path for the data dissemination is referred to as a "data dissemination tree."

Research on mobile crowd sensing methods have been recently conducted, but the only method that has been introduced is a method for integrating a mobile terminal and sensors that can be connected by one hop to the mobile terminal, in which the terminal and the sensors are managed in a centralized manner. Accordingly, the terminal is limited in its ability to collect sensor data accurately and quickly in real time over a wide area that extends beyond a specific area within which the terminal is capable of collecting sensor data from sensors that are one hop away.

SUMMARY

In one general aspect, a cloud-based sensor data acquisition system includes one or more sensors configured to acquire sensor data; a first terminal configured to transmit sensor data request information to a cloud server through an access point (AP); and one or more second terminals each configured to acquire sensor data from one or more sensors on a corresponding dissemination tree received from the cloud server; and transmit the acquired sensor data to the first terminal through the AP; wherein the cloud server is configured to, in response to receiving the sensor data request information from the first terminal, build a corresponding dissemination tree for each of one or more second terminals within a sensing range; and transmit the corresponding dissemination tree to each of the one or more second terminals within the sensing range.

Sensing range information about the sensing range may included in the sensor data request information, or may be previously set in the cloud server.

The cloud server may be further configured to build the corresponding dissemination tree for each of the one or more second terminals within the sensing range by performing a breadth-first search (BFS) for each of the one or more second terminals within the sensing range to minimize a number of hops to each of a plurality of sensors.

The one or more second terminals within the sensing range may be selected from all second terminals within the sensing range in accordance with a predefined criterion.

The predefined criterion may include any one or any combination of a purpose of avoiding an exclusive use of mobile terminal resources, a status of a network between the first terminal and the second terminals, and a density of the first terminal and the second terminals within the sensing range.

In another general aspect, a cloud server includes a dissemination tree building unit configured to build a corresponding dissemination tree for each of one or more second terminals within a sensing range in response to sensor data request information received from a first terminal; and a terminal link unit configured to receive the sensor data request information from the first terminal; and transmit the corresponding dissemination tree built by the dissemination tree building unit to each of the one or more second terminals within the sending range.

The cloud server may further include a terminal selecting unit configured to select the one or more second terminals within the sensing range for which corresponding dissemination trees are to be built from all second terminals within the sensing range in accordance with a predefined criterion.

In another general aspect, a first terminal includes a cloud link unit configured to transmit sensor data request information to a cloud server through an access point (AP); and a sensor data transmitting and receiving unit configured to receive sensor data through the AP from one or more second terminals each configured to receive a corresponding dissemination tree from the cloud server and acquire sensor data from one or more sensors on the corresponding dissemination tree.

The cloud link unit may be further configured to receive a dissemination tree from the cloud server; and the first terminal may further include a sensor link unit configured to acquire sensor data from one or more sensors on the dissemination tree received by the cloud link unit.

In another general aspect, a second terminal includes a cloud link unit configured to receive a dissemination tree from a cloud server; a sensor link unit configured to acquire sensor data from one or more sensors on the dissemination tree; and a sensor data transmitting and receiving unit configured to transmit the acquired sensor data through an access point (AP) to a first terminal configured to request the acquired sensor data.

In another general aspect, a cloud-based sensor data acquisition method includes receiving, in a cloud server, sensor data request information from a first terminal; building, in the cloud server, a corresponding dissemination tree for each of one or more second terminals within a sensing range; and transmitting, in the cloud server, the corresponding dissemination tree to each of the one or more second terminals within the sensing range.

The building of the dissemination tree may include building the dissemination tree by performing a breadth-first search (BFS) for each of the one or more second terminals within the sensing range to minimize a number of hops to each of a plurality of sensors.

In another general aspect, a cloud-based sensor data acquisition method includes transmitting, in a first terminal, sensor data request information to a cloud server through an access point (AP); and receiving, in the first terminal, through the AP, sensor data acquired by one or more second terminals from one or more sensors on a corresponding dissemination tree that each of the one or more second terminals has received from the cloud server.

The cloud-based sensor data acquisition method may further include receiving, in the first terminal, a dissemination tree from the cloud server; and acquiring, in the first terminal, sensor data from one or more sensors on the dissemination tree received in the first terminal.

In another general aspect, a cloud-based sensor data acquisition method includes receiving, in each of one or more second terminals, a corresponding dissemination tree from a cloud server; acquiring, in each of the one or more second terminals, sensor data from one or more sensors on the corresponding dissemination tree; and transmitting, in each of the one or more second terminals, the acquired sensor data through an access point (AP) to a first terminal that has requested the acquired sensor data.

Other features and aspects will be apparent from the following detailed description, the drawings, and the claims.

DETAILED DESCRIPTION

The following description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. Also, descriptions of functions and constructions that are well known to one of ordinary skill in the art may be omitted for increased clarity and conciseness.

Throughout the drawings and the detailed description, the same drawing reference numerals refer to the same elements. The drawings may not be to scale, and the relative size, proportions, and depiction of elements in the drawings may be exaggerated for clarity, illustration, and convenience.

Figure 1:
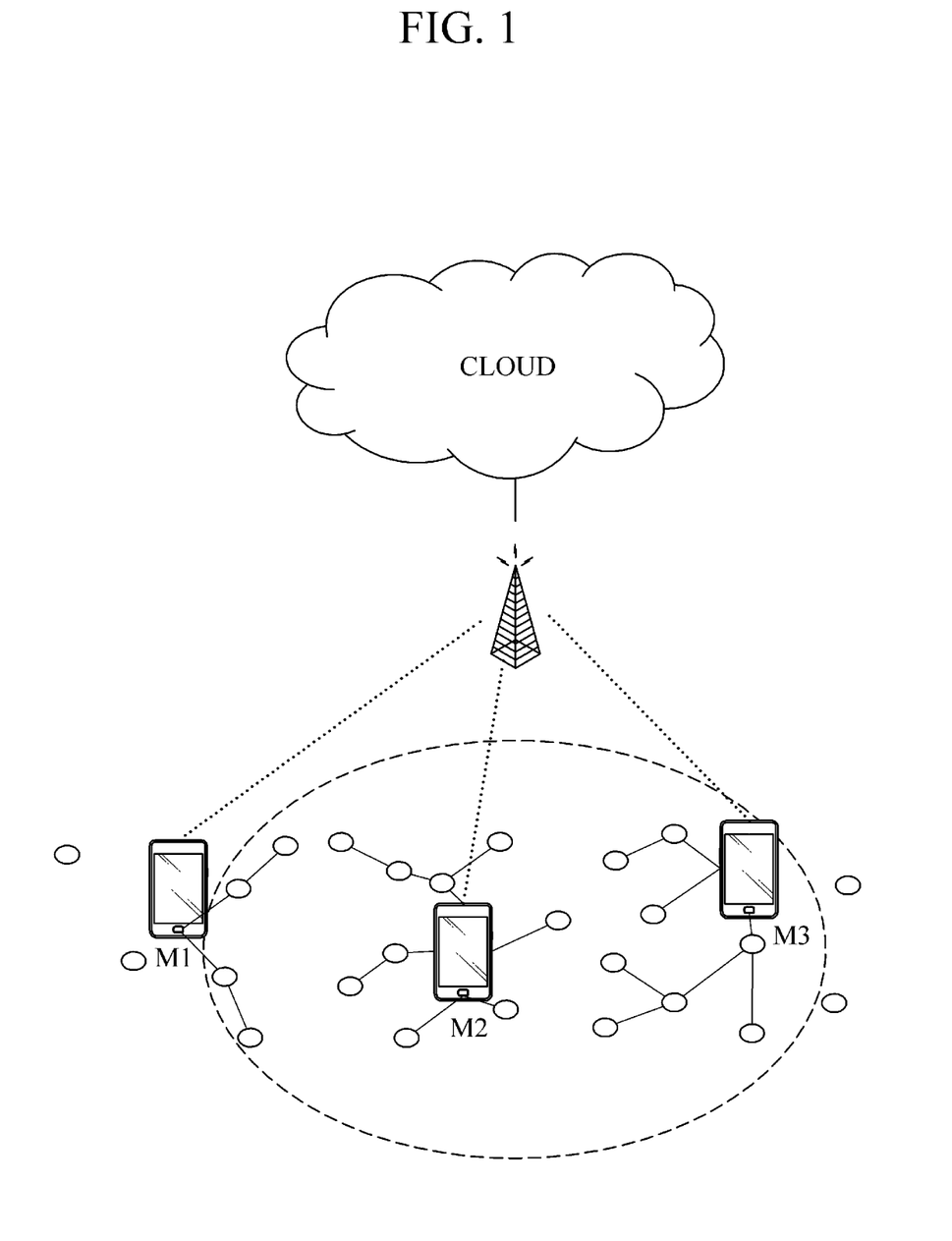
FIG. 1 is a diagram illustrating an example of a cloud-based sensor data acquisition system.

FIG. 1 is a diagram illustrating an example of a cloud-based sensor data acquisition system. A cloud-based sensor data acquisition system enables a user of a terminal to acquire sensor data from sensors via other terminals in association with a cloud. The sensors may be located across a wide area. For example, if a user who goes for a walk carrying a terminal M2 wishes to obtain route information that avoids a contaminated area, the user may link the user's terminal M2 to the cloud to acquire contamination information acquired by other nearby terminals M1 and M3 from sensors near the terminals M1 and M3.

The cloud-based sensor data acquisition system assigns both management of locations of the sensors and the terminals and formation of a data dissemination tree based on these locations to a cloud server, and assigns acquisition and dissemination of sensor data to each of the terminals. Accordingly, the cloud-based sensor data acquisition system is able to acquire real-time sensor data more quickly than when acquisition of sensor data is managed in a centralized manner.

Figure 2:
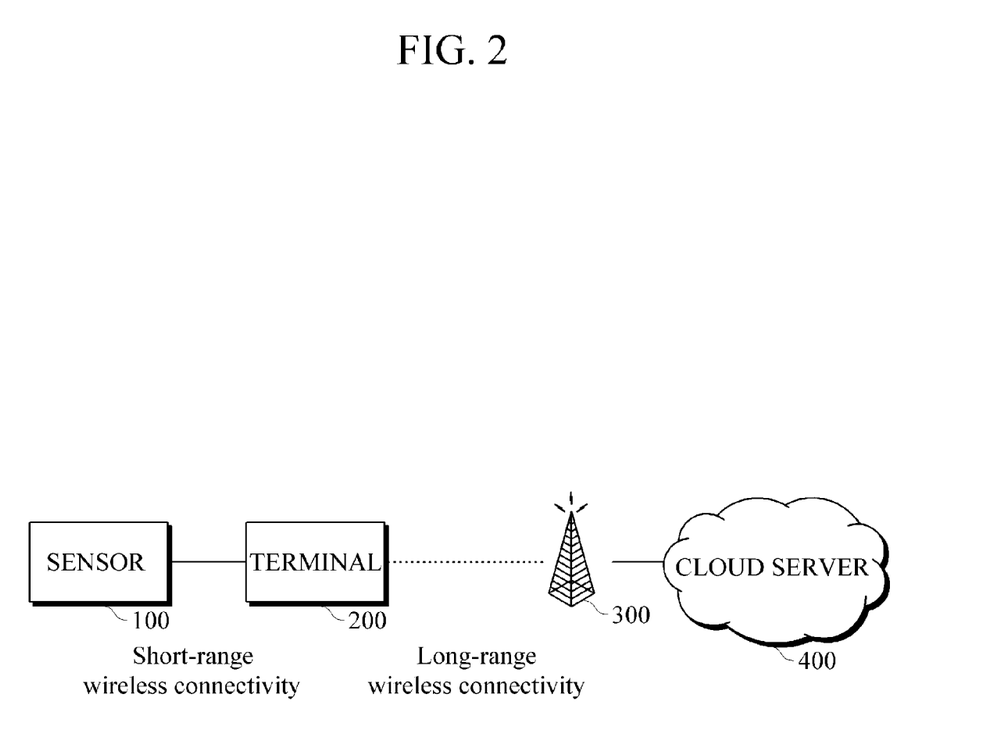
FIG. 2 is a diagram illustrating an example of a cloud-based sensor data acquisition system.

FIG. 2 is a diagram illustrating an example of a cloud-based sensor data acquisition system. The cloud-based sensor data acquisition system includes a sensor 100, a terminal 200, and a cloud server 400. For simplicity, only one sensor 100 and one terminal 200 are shown in FIG. 2. However, the cloud-based sensor data acquisition system may include a plurality of sensors 100 and a plurality of terminals 200. The sensor 100 operates as a source node to acquire sensor data, and may acquire various sensor data from the real world. The various sensor data may include voice data, image data, temperature data, pollution level data, air composition measurement data, and any other data that can be obtained by a sensor in the real world. The sensor 100 has the capability of connecting to the terminal 200, other terminals 200 (not shown), and other sensors 100 (not shown) using short-range wireless connectivity.

The terminal 200 illustrated in FIG. 2 may operate as a first terminal that requests sensor data, and/or a second terminal that acquires sensor data from one or more sensors and transmits the acquired sensor data to the first terminal. Thus, the terminal 200 may operate as the first terminal, or the second terminal, or both the first terminal and the second terminal. In following description, the terminal 200 will be referred to as the first terminal 200 when describing operations performed by the first terminal, and will be referred to as the second terminal 200 when describing operations performed by the second terminal.

The first terminal 200 transmits sensor data request information to the cloud server 400 through an access point (AP) 300 using long-range wireless connectivity, receives a dissemination tree from the cloud server 400, and acquires sensor data from one or more sensors 100 on the dissemination tree.

One or more second terminals 200 each acquire sensor data from one or more sensors on a corresponding dissemination tree received from the cloud server 400, and transmit the acquired sensor data to the first terminal through the AP 300.

The cloud server 400 receives sensor data request information from the first terminal 200, builds a corresponding dissemination tree for each of one or more second terminals 200 within a sensing range within which a user of the first terminal 200 wants to acquire sensor data, and transmits the corresponding dissemination tree to each of the one or more second terminals 200 within the sensing range. The cloud server 400 also builds a dissemination tree for the first terminal 200, and transmits the dissemination tree to the first terminal 200.

Sensing range information about the sensing range within which the user of the first terminal 200 wants to acquire sensor data may be transmitted by a user of the first terminal 200 through the first terminal 200 as part of the sensor data request information, or may be previously set in the cloud server 400. The sensing range may be, for example, a predetermined distance, such as a radius of 100 meters or 200 meters, from a current location of the user or a specific region of a particular administrative district. For example, the first terminal 200 that requests the sensor data may transmit to the cloud server 400 sensing range information about the sensing range by including the sensing range information in the sensor data request information. However, even when the sensor data request information includes the sensing range information, the cloud server 400 may limit the sensing range to a specific area depending on a status of a network between the terminals 200, and/or a density of the terminals 200 within the sensing range, and/or any other factor that makes it impossible or impractical for the sensing range to be the sensing range specified in the sensing range information.

When the cloud server 400 receives the sensor data request information from the first terminal 200, the cloud server 400 uses location information of the sensors 100 and the terminals 200 under its control to build a corresponding dissemination tree for each of the terminals 200 within the sensing range. In this example, the cloud server 400 performs a breadth-first search (BFS) to construct a dissemination tree for each of the terminals 200 within the sensing range to minimize a number of hops to each of the sensors 100. However, this is merely an example, and any method for building a dissemination tree known to one of ordinary skill in the art may be used.

In greater detail, to build the dissemination tree, the cloud server constructs a graph for each of the terminals 200 that connects that terminal 200 with all of the sensors 100 that are able to communicate with that terminal 200, either directly (a one-hop connection) or indirectly via one or more other sensors 100 (a multi-hop connection). Then, a BFS is performed for each of the terminals 200 to calculate a number of hops from each of the terminals 200 to each of the sensors 100 connected to that terminal 200 in the graph for that terminal 200, and an ID of the terminal 200 having a minimum number of hops to a particular sensor 100 and the calculated number of hops from that terminal 200 to the particular sensor 100 are recorded in the particular sensor 100. In other words, a particular sensor 100 might be connected to more than one terminal 200 in the graphs for those terminals 200, but the number of hops to the particular sensor 200 might be greater for one of those terminals 200 that for the other ones of those terminals 200. That is, the path from one of those terminals 200 to the particular sensor node 100 might be longer than the paths from the other ones of those terminals 200 to the particular sensor node. Performing the BFS enables the shortest path to be selected. By performing path selection for all of the sensors 100 in this manner, a dissemination tree from each sensor to one of the terminals 200 providing the shortest path is finally established.

In one example, the cloud server 400 may build a dissemination tree for each of some terminals 200 within the sensing range selected in accordance with a predefined criterion from all terminals 200 within the sensing range. The predefined criterion may include any one or any combination of a purpose of avoiding an exclusive use of mobile terminal resources, a status of a network between the terminals 200, and a density of the terminals 200 within the sensing range. The predefined criterion may be previously set in the cloud server 400 and may be managed by the cloud server 400.

For example, a great number of terminals 200 may be densely placed in a specific site in a crowded area, for example, where the terminals 200 are mobile terminals of users attending a sporting event or concert. In this example, if a dissemination tree is built for each of all of the terminals 200 in the area and sensor data is acquired by all of the terminals 200 in the area, an unnecessary consumption of resources and an exclusive use of mobile terminal resources may occur. In some situations, a network connection with particular terminals 200 may be poor. To account for such situations, some terminals 200 may be selected from all of the terminals 200 within the sensing range, and dissemination trees may be built only for the selected terminals 200.

Figure 3:
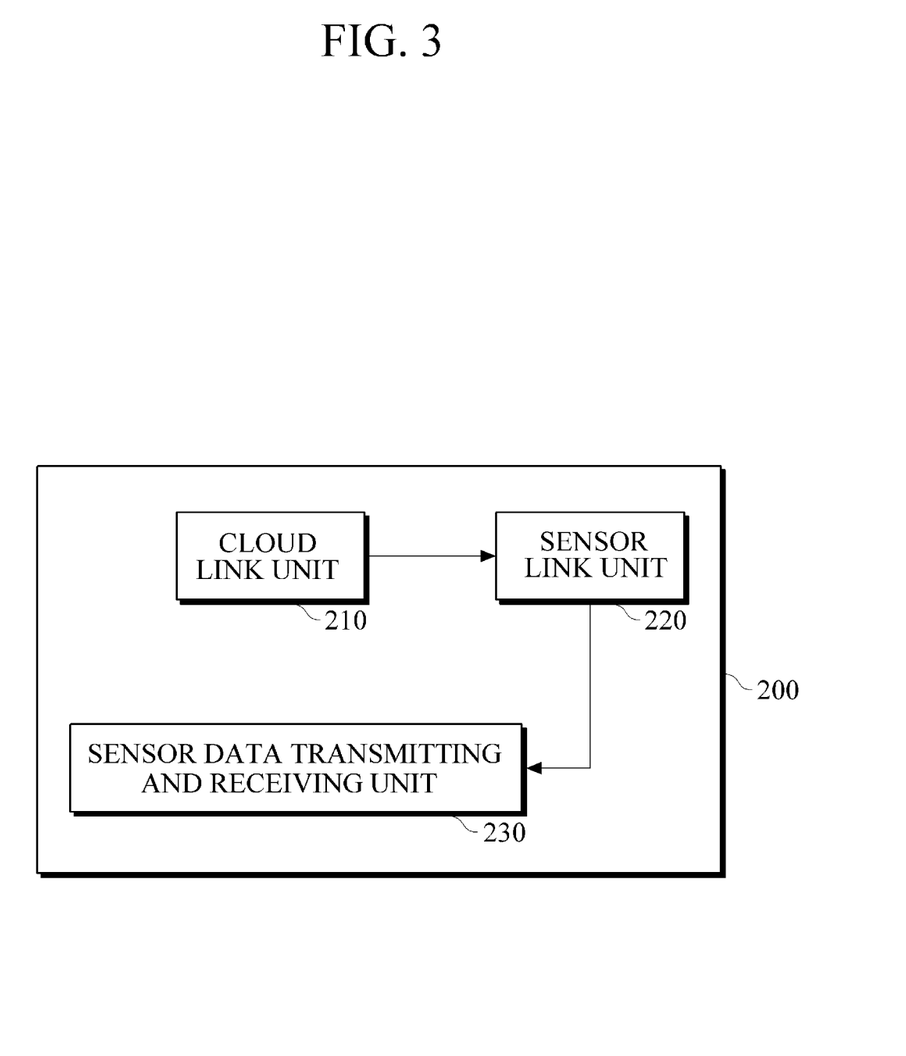
FIG. 3 is a diagram illustrating an example of a terminal shown in FIG. 2.

FIG. 3 is a diagram illustrating an example of a terminal 200 shown in FIG. 2. The terminal 200 may operate as a first terminal 200 that requests sensor data via the cloud server 400 as described above, and/or a second terminal 200 that acquires sensor data from one or more sensors and transmits the acquired sensor data to the first terminal 200. Thus, the terminal 200 may operate as the first terminal 200, or the second terminal 200, or both the first terminal 200 and the second terminal 200. In the following description, the terminal 200 will be referred to as the first terminal 200 when describing operations performed by the first terminal 200, or as the second terminal 200 when describing operations performed by the second terminal 200.

The terminal 200 includes a cloud link unit 210, a sensor link unit 220, and a sensor data transmitting and receiving unit 230. The cloud link unit 210 of the first terminal 200 requests sensor data via the cloud server 400 by transmitting sensor data request information to the cloud server 400 through the AP 300. The cloud link unit 210 of the first terminal 200 and the second terminal 200 receives a dissemination tree from the cloud server 400.

The sensor link unit 220 of the first terminal 200 and the second terminal 200 receives the dissemination tree from the cloud link unit 210, and acquires sensor data from one or more sensors on the dissemination tree.

The sensor data transmitting and receiving unit 230 of the first terminal 200 receives sensor data from one or more second terminals 200 through the AP 300. The sensor data is sensor data that has been acquired by the one or more second terminals 200 from one or more sensors on corresponding dissemination trees that the one or more second terminals 200 have received from the cloud server 400. The sensor data transmitting and receiving unit 230 of each of the one or more second terminals 200 transmits the acquired sensor data to the first terminal 200 through the AP 300 without transmitting the acquired sensor data to the cloud server 400. Thus, each terminal 200 is enabled to disseminate sensor data by transmitting and receiving the sensor data through the AP 300 without the sensor data passing through the cloud server 400.

In addition, a dissemination tree received by the cloud link unit 210 of the second terminal 200 may include first terminal information about the first terminal 200 that has requested particular sensor data. The sensor data transmitting and receiving unit 230 of the second terminal 200 identifies the first terminal 200 that has requested the particular sensor data based on the first terminal information included in the dissemination tree received by the cloud link unit 210, and transmits the particular sensor data to the identified first terminal 200 through the AP 300.

Figure 4:
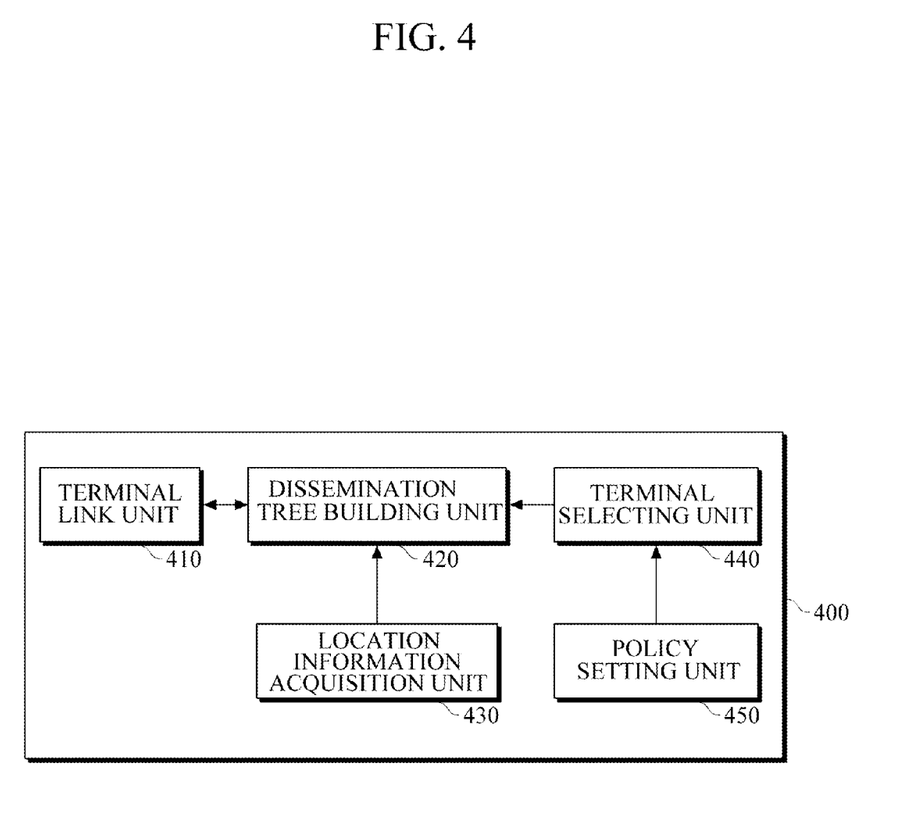
FIG. 4 is a diagram illustrating an example of a cloud server shown in FIG. 2.

FIG. 4 is a diagram illustrating an example of a cloud server 400 shown in FIG. 2. Referring to FIG. 4, the cloud server 400 includes a terminal link unit 410 and a dissemination tree building unit 420.

The terminal link unit 410 transmits and receives a variety of data to and from the terminal 200 via the AP 300. The terminal link unit 410 receives sensor data request information from the first terminal 200, and requests the dissemination tree building unit 420 to build a dissemination tree for the first terminal 200 and each of second terminals 200 within a sensing range within which a user of the first terminal 200 wants to acquire sensor data in response to the sensor data request information. After each dissemination tree has been built by the dissemination tree building unit 420, the terminal link unit 410 transmits the dissemination tree to a first or second terminal 200 for which the dissemination tree was built.

When the dissemination tree building unit 420 receives a request for building a dissemination tree from the terminal link unit 410, the dissemination tree building unit 420 builds a dissemination tree for the first terminal 200 and each of the second terminals 200 within the sensing range according to the received sensor data request information.

In this example, sensing range information about the sensing range is transmitted by the user through the first terminal 200 as part of the sensor data request information, or is previously set in the cloud server 400. The sensing range may be, for example, a predetermined distance, such as a radius of 100 meters or 200 meters, from a current location of the user or a specific region of a particular administrative district. For example, the first terminal 200 that requests sensor data may include sensing information about the sensing range in the sensor data request information that the first terminal transmits to the cloud server 400. However, even when the sensor data request information includes the sensing range information, the cloud server 400 may limit the sensing range to a specific area depending on a status of a network between the terminals 200, and/or a density of the terminals 200 within the sensing range, and/or any other factor that makes it impossible or impractical for the sensing range to be the sensing range in the sensing range information.

The cloud server 400 includes a location information acquisition unit 430. When the terminal link unit 410 receives the sensor data request information from the first terminal 200, the dissemination tree building unit 420 controls the location information acquisition unit 430 to acquire location information of sensors 100 and terminals 200 that are under the control of the cloud server 400. Alternatively, the location information acquisition unit 430 may periodically acquire the location information of the sensors 100 and the terminals 200 that are under the control of the cloud server 400, and store the location information in a location information database (not shown) for management. The dissemination tree building unit 420 builds a dissemination tree for each of the terminals 200 within the sensing range using the location information of the sensors 100 and the terminals 200. The dissemination tree building unit 420 performs a BFS for each of the terminals 200 within the sensing range to build the dissemination tree for each of the terminals 200 to minimize a number of hops to each of the sensors 100.

The cloud server 400 further includes a terminal selecting unit 440 and a policy setting unit 450. The terminal selecting unit 440 selects some terminals 200 for which a dissemination tree is to be built from all terminals 200 within the sensing range in accordance with a predefined criterion. The predefined criterion may include any one or any combination of a purpose of avoiding an exclusive use of mobile terminal resources, a status of a network between the terminals 200, and a density of the terminals 200 within the sensing range.

The policy setting unit 450 sets and manages various policies under control of a manager of the cloud server 400. The policies set and managed by the policy setting unit 450 may include information about the number of terminals 200 to be selected in accordance with criteria, and information about a specific area to which a sensing range is to be limited depending on a status of a network between the terminals 200, and/or a density of the terminals 200 within the sensing range, and/or any other factor that makes it impossible or impractical for the sensing range to be the sensing range specified in the sensing range information.

The terminal selecting unit 440 checks the policies set and managed by the policy setting unit 450, and if a predefined criterion of the policies is satisfied, such as a status of a network between the terminals 200 satisfying a predetermined criterion, or a density of the terminals 200 within the sensing range satisfying a predetermined criterion, the terminal selecting unit 440 selects some terminals 200 for which a dissemination tree is to be built from all terminals 200 within a sensing range.

Figure 5:
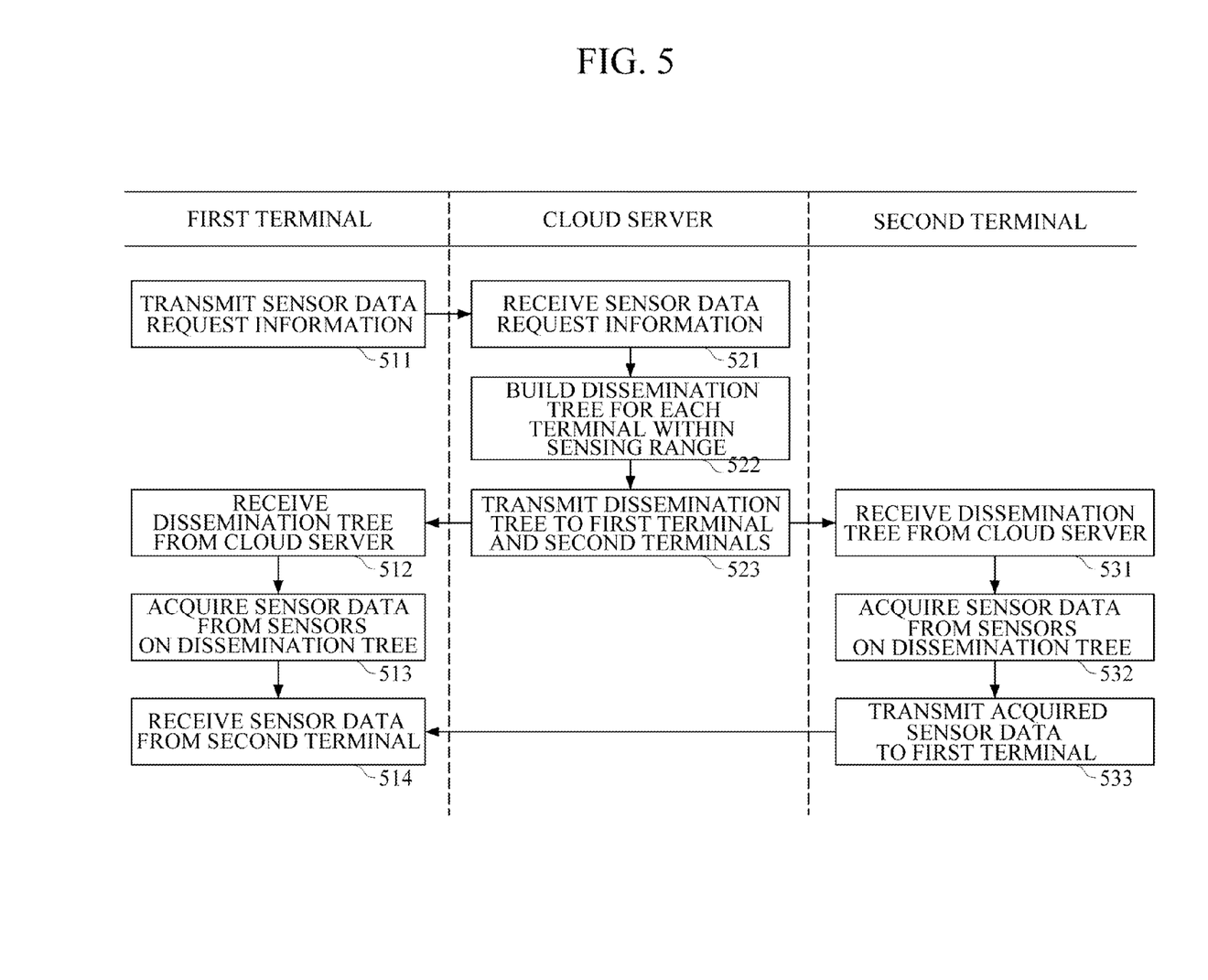
FIG. 5 is a flowchart illustrating a method of acquiring sensor data based on integration of a terminal and a cloud.

FIG. 5 is a flowchart illustrating a method of acquiring sensor data based on integration of a terminal and a cloud. The method will be explained by referring to a first terminal 200, a cloud server 400, and a second terminal 200.

Operations performed by the first terminal 200 will now be described with reference to FIG. 5 in conjunction with FIG. 2.

The first terminal 200 transmits sensor data request information to the cloud server 400 through the AP 300 in operation 511. The sensor data request information may include sensing range information about a sensing range within which a user of the first terminal 200 wants to acquire sensor data. For example, the sensing range may be a radius of 100 meters or 200 meters from a current location of the user or a specific region of a particular administrative district.

Then, the first terminal 200 receives a dissemination tree built for the first terminal 200 from the cloud server 400 in operation 512, and acquires sensor data from one or more sensors 100 on the dissemination tree in operation 513. The dissemination tree is built by the cloud server 400 to enable the first terminal 200 to acquire sensor data from one or more sensors 100 near the first terminal 200.

In operation 514, the first terminal 200 receives through the AP 300 sensor data from one or more second terminals 200 that the one or more second terminals 200 have acquired from one or more sensors on corresponding dissemination trees that the one or more second terminals have received from the cloud server 400.

Operations performed by the cloud server 400 will now be described with reference to FIG. 5 in conjunction with FIG. 2.

The cloud server 400 receives sensor data request information from the first terminal 200 in operation 521, and builds a dissemination tree for the first terminal 200 and each of the one or more second terminals 200 within a sensing range in operation 522. Sensing range information about the sensing range may be included in the sensor data request information received from the first terminal 200, or alternatively, may be previously set in the cloud server 400. The sensing range may be, for example, a predetermined distance, such as a radius of 100 meters or 200 meters, from a current location of the user of the first 200 or a specific region of a particular administrative district. However, even when the sensor data request information includes the sensing range information, the cloud server 400 may limit the sensing range to a specific area depending on a status of a network between the terminals 200, and/or a density of the terminals 200 within the sensing range, and/or any other factor that makes it impossible or impractical for the sensing range to be the sensing range specified in the sensing range information.

In operation 522, the cloud server 400 builds a dissemination tree for each of the terminals 200 within the sensing range using the location information of the sensors 100 and the terminals 200 that are under the control of the cloud server 400 that was acquired by the cloud server 400. The cloud server 400 performs a BFS on each of the terminals 200 within the sensing range to build a corresponding dissemination tree for each of the terminals 200 to minimize a number of hops to each of the sensors 100.

The operation 522 may also include selecting some terminals 200 for which a dissemination tree is to be built from all terminals 200 within the sensing range in accordance with a predefined criterion. The predefined criterion may include any one or any combination of a purpose of avoiding an exclusive use of mobile terminal resources, a status of a network between the terminals 200, and a density of the terminals 200 within the sensing range.

The corresponding dissemination trees built for the terminals 200 are transmitted to the first terminal 200 and the one or more second terminals 200 in operation 523 to enable the terminals 200 to acquire sensing data from one or more sensors on the corresponding dissemination trees.

Operations performed by the second terminal 200 will now be described with reference to FIG. 5 in conjunction with FIG. 2.

The second terminal 200 receives a corresponding dissemination tree from the cloud server in operation 531. The dissemination tree includes information about the first terminal 200 that requested sensor data. The second terminal 200 acquires sensor data from one or more sensors 100 on the dissemination tree in operation 532. Finally, in operation 533, the second terminal 200 transmits the acquired sensor data through the AP 300 to the first terminal 200 that requested the sensor data.

Figure 6:
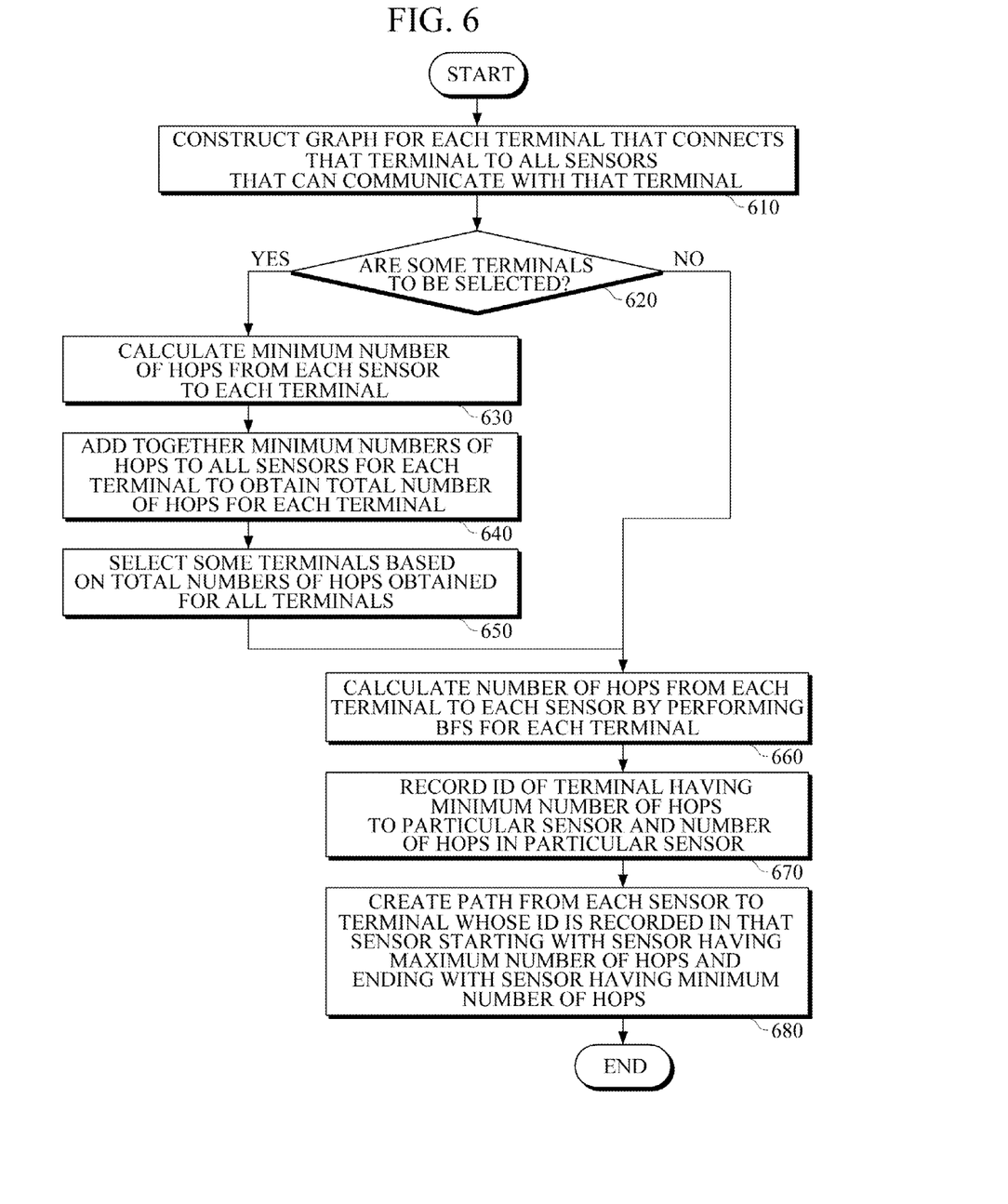
FIG. 6 is a flowchart illustrating in detail an example of a method of building a dissemination tree.

FIG. 6 is a flowchart illustrating in detail an example of a method of building a dissemination tree. Operations of the cloud server 400 for building a dissemination tree will be described in detail with reference to FIG. 6.

In operation 610, a graph for each of the terminals 200 within the sensing range that connects that terminal 200 with all of the sensors 100 that are able to communicate with that terminal 200, either directly (a one-hop connection) or indirectly via one or more other sensors 100 (a multi-hop connection), is constructed.

Then, in operation 620, it is determined whether some of the terminals 200 within the sensing range are to be selected by determining whether a predefined criterion is satisfied. If the predetermined criterion is satisfied, some of the terminals 200 within the sensing range will be selected and corresponding dissemination trees will be built for the selected terminals 200. If the predetermined criterion is not satisfied, corresponding dissemination trees will be built for all of the terminals 200 within the sensing range. The predefined criterion may include any one or any combination of a purpose of avoiding an exclusive use of mobile terminal resources, a status of a network between the terminals 200, and a density of the terminals 200 within the sensing range.

To select some of the terminals 200 if the predefined criterion is satisfied, a minimum number of hops from each of the terminals 200 within the sensing range to each of the sensors 100 is calculated in operation 630.

In operation 640, the minimum numbers of hops from each of the terminals 200 within the sensing range to all of the sensors 100 are added together for each of the terminals 200 to obtain a total number of hops for each of the terminals 200. For example, if there are 5 sensors and the minimum numbers of hops from a particular terminal 200 to the 5 sensors are 1, 2, 1, 3, and 2, the total number of hops for that particular terminal 200 is 1+2+1+3+2=9.

Then, based on the total numbers of hops for all of the terminals 200 within the sensing range, some of the terminals 200 within the sensing range are selected from all of the terminals 200 within the sensing range in operation 650. The selection may be made, for example, by sorting all of the terminals 200 within the sensing range according to the total numbers of hops, and a predetermined number of the terminals 200 having the smallest total numbers of hops are selected from all of the terminals 200 to improve a data dissemination speed. The process then proceeds to operation 660.

If the predefined criterion is not satisfied, the operations 630 through 650 are omitted, and the process proceeds directly to operation 660.

In operation 660, a BFS is performed for each of the selected terminals 200 within the sensing range if some terminals 200 were selected in operation 650, or for each of all of the terminals 200 within the sensing range if the operations 630 to 650 were omitted, to calculate a number of hops from each of the terminals 200 within the sensing range for which the BFS is performed to each of the sensors 100.

Then, an ID of one of the terminals 200 for which the BFS was performed having a minimum number of hops to a particular sensor 100 and the number of hops from that terminal 200 to the particular sensor 100 are recorded in the particular sensor 100 in operation 670.

Then, in operation 680, a path from each of the sensors 100 to the terminal 200 whose ID is recorded in the sensor is created to build a corresponding dissemination for each of the terminals 200 for which the BFS was performed. For each of the terminals 200 for which the BFS was performed, the paths are created starting with the sensor or sensors having the maximum number of hops for the terminal 200 and ending with the sensor or sensors having the minimum number of hops for the terminal 200.

As a non-exhaustive illustration only, a terminal described herein may be a mobile device, such as a cellular phone, a personal digital assistant (PDA), a portable laptop PC, a tablet, a sensor, or any other mobile device known to one of ordinary skill in the art that is capable of wireless communication and/or network communication.

The sensor 100, the sensor 200, the cloud link unit 210, the sensor link 220, the sensor data transmitting and receiving unit 230, the terminal link unit 410, the dissemination tree building unit 420, the location information acquisition unit 430, the terminal selecting unit 440, and the policy setting unit 450 described above may be implemented using one or more hardware components, one or more software components, or a combination of one or more hardware components and one or more software components.

A hardware component may be, for example, a physical device that physically performs one or more operations, but is not limited thereto. Examples of hardware components include amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A cloud-based sensor data acquisition system comprising:
    a memory configured to store instructions to be executed by a processor;
    one or more sensors configured to acquire sensor data;
    a first terminal comprising a processor and configured to transmit sensor data request information to a cloud server through an access point (AP); and
    one or more second terminals, each comprising a processor and configured to:
        acquire sensor data from one or more sensors on a corresponding dissemination tree received from the cloud server; and
        transmit the acquired sensor data to the first terminal through the AP;
    wherein the cloud server is configured to, in response to receiving the sensor data request information from the first terminal:
        select, the one or more second terminals from all second terminals within a sensing range for which corresponding dissemination trees are to be built in accordance with a predefined criterion;
        build a corresponding dissemination tree comprising a path from a source node to the selected one or more second terminals for each of the selected one or more second terminals within the sensing range; and
        transmit the corresponding dissemination tree to each of the one or more second terminals within the sensing range.

2. The cloud-based sensor data acquisition system of claim 1, wherein sensing range information about the sensing range is included in the sensor data request information, or is previously set in the cloud server.

3. The cloud-based sensor data acquisition system of claim 1, wherein the cloud server is further configured to build the corresponding dissemination tree for each of the one or more second terminals within the sensing range by performing a breadth-first search (BFS) for each of the one or more second terminals within the sensing range to minimize a number of hops to each of a plurality of sensors.

4. The cloud-based sensor data acquisition system of claim 1, wherein the predefined criterion comprises any one or any combination of a purpose of avoiding an exclusive use of mobile terminal resources, a status of a network between the first terminal and the second terminals, and a density of the first terminal and the second terminals within the sensing range.

5. A cloud server comprising:
a memory configured to store instructions to be executed by a processor;
a terminal selecting unit configured to select one or more second terminals within a sensing range for which corresponding dissemination trees are to be built from all second terminals within the sensing range in accordance with a predefined criterion;
a dissemination tree building processor configured to build a corresponding dissemination tree comprising a path from source node to the selected one or more second terminals for each of the one or more second terminals within the sensing range in response to sensor data request information received from a first terminal; and
a terminal link processor configured to:
receive the sensor data request information from the first terminal; and
transmit the corresponding dissemination tree built by the dissemination tree building unit to each of the one or more second terminals within the sending range.

6. The cloud server of claim 5, wherein sensing range information about the sensing range is included in the sensor data request information, or is previously set in the cloud server.

7. The cloud server of claim 5, wherein the predefined criterion comprises any one or any combination of a purpose of avoiding an exclusive use of mobile terminal resources, a status of a network between the first terminal and the second terminals, and a density of the first terminal and the second terminals within the sensing range.

8. A first terminal comprising:
a memory configured to store instructions to be executed by a processor;
a cloud link processor configured to transmit sensor data request information to a cloud server through an access point (AP) or to receive a dissemination tree comprising a path from source node to the one or more first terminals from a cloud server; and
a sensor data transmitter and receiver configured to receive sensor data through the AP from one or more first terminals each configured to receive a corresponding dissemination tree comprising a path from a source node to the one or more first terminals from the cloud server and acquire sensor data from one or more sensors on the corresponding dissemination tree, or to transmit acquired sensor data through the AP to a second terminal configured to request the acquired sensor data,
wherein the dissemination tree is built corresponding to the one or more first terminals selected from all first terminals within a sensing range by the cloud server in accordance with a predefined criterion.

9. The first terminal of claim 8, wherein the cloud link unit is further configured to receive a dissemination tree from the cloud server; and
the first terminal further comprises a sensor link unit configured to acquire the sensor data from one or more sensors on the dissemination tree received by the cloud link unit.

10. A cloud-based sensor data acquisition method comprising:
receiving, in a cloud server, sensor data request information from a first terminal;
selecting, in the cloud server, one or more second terminals within a sensing range for which corresponding dissemination trees are to be built from all second terminals within the sensing range in accordance with a predefined criterion, wherein each dissemination tree comprises a path from a source node to the selected one or more second terminals;
building, in the cloud server, a corresponding dissemination tree comprising the path from the source node to the selected one or more second terminals for each of the one or more second terminals within a sensing range; and
transmitting, in the cloud server, the corresponding dissemination tree to each of the one or more second terminals within the sensing range.

11. The cloud-based sensor data acquisition method of claim 10, wherein sensing range information about the sensing range is included in the sensor data request information or is previously set in the cloud server.

12. The cloud-based sensor data acquisition method of claim 10, wherein the building of the dissemination tree comprises building the dissemination tree by performing a breadth-first search (BFS) for each of the one or more second terminals within the sensing range to minimize a number of hops to each of a plurality of sensors.

13. The cloud-based sensor data acquisition method of claim 10, wherein the predefined criterion comprises any one or any combination of a purpose of avoiding the exclusive use of mobile terminal resources, a status of a network between the first terminal and the second terminals, and a density of the first terminal and the second terminals within the sensing range.

14. A cloud-based sensor data acquisition method comprising:
transmitting, in a first terminal, sensor data request information to a cloud server through an access point (AP); and
receiving, in the first terminal, through the AP, sensor data acquired by one or more second terminals from one or more sensors on a corresponding dissemination tree comprising a path from a source node to the one or more second terminals that each of the one or more second terminals has received from the cloud server,
wherein the dissemination tree is built corresponding to the one or more second terminals selected from all second terminals within a sensing range by the cloud server in accordance with a predefined criterion.

15. The cloud-based sensor data acquisition method of claim 14, further comprising:
receiving, in the first terminal, a dissemination tree from the cloud server; and
acquiring, in the first terminal, sensor data from one or more sensors on the dissemination tree received in the first terminal.

16. A cloud-based sensor data acquisition method comprising:
receiving, in each of one or more second terminals, a corresponding dissemination tree from a cloud server;
acquiring, in each of the one or more second terminals, sensor data from one or more sensors on the corresponding dissemination tree comprising a path from a source node to the one or more second terminals; and transmitting, in each of the one or more second terminals, the acquired sensor data through an access point (AP) to a first terminal that has requested the acquired sensor data, wherein the dissemination tree is built corresponding to the one or more second terminals selected from all second terminals within a sensing range by the cloud server in accordance with a predefined criterion.

\* \* \* \* \*